G. A. BARON.
Machine for Measuring and Cutting Wire.
No. 212,426.   Patented Feb. 18, 1879.
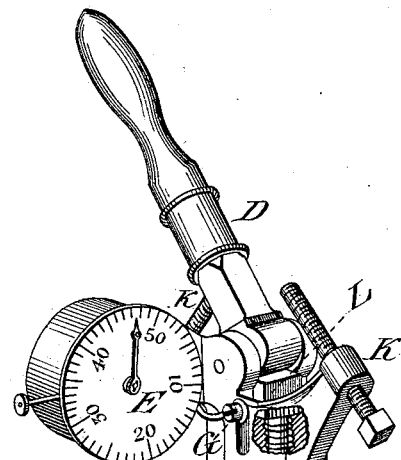
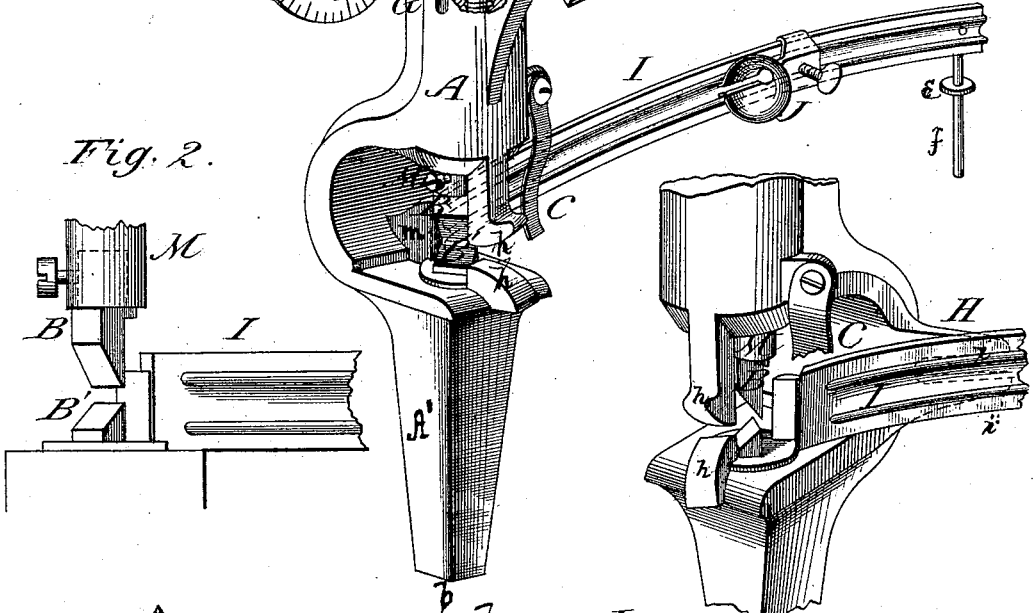
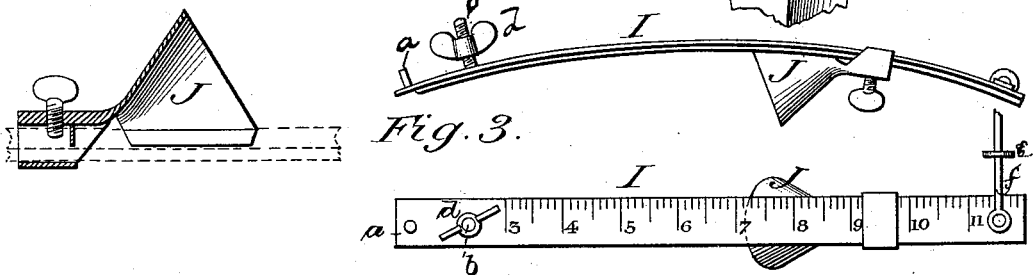
Attest:
Daniel Minthorn
L. M. Spencer
Inventor:
Gustavus Alfred Baron

UNITED STATES PATENT OFFICE.

GUSTAVUS A. BARON, OF GOUVERNEUR, NEW YORK.

IMPROVEMENT IN MACHINES FOR MEASURING AND CUTTING WIRE.

Specification forming part of Letters Patent No. 212,426, dated February 18, 1879; application filed July 3, 1877.

*To all whom it may concern:*

Be it known that I, GUSTAVUS A. BARON, of Gouverneur, in the county of St. Lawrence, and in the State of New York, have invented certain new and useful Improvements in Apparatus for Cutting and Measuring Wire; and do hereby declare that the following is a full, clear, and exact description thereof, reference being had to the accompanying drawings, and to the letters of reference marked thereon, making a part of this specification.

The nature of my invention consists in the construction and arrangement of a machine for cutting, measuring, and counting pieces of wire or other metal, as will be hereinafter more fully set forth.

In order to enable others skilled in the art to which my invention appertains to make and use the same, I will now proceed to describe its construction and operation, referring to the annexed drawings, in which—

Figure 1 is a perspective view of my machine. Fig. 2 is an enlarged view of the cutters, showing their form and relative position. Fig. 3 is an enlarged view of the curved scale and gage.

A represents the frame or body of the machine, constructed substantially in the form shown, and provided with a tapering shank, A', at the bottom, adapted to a tin-smith's bench, and having curves and projections in the column above the shank, as the nature of the case may require. B is the movable cutter, attached to the plunger M, and B' is the stationary cutter.

C represents a spring, adjustably secured to the frame A, for the purpose of throwing off or dropping the wire as soon as it is cut off. From the plunger M, through a slot in the body A, projects a pin or other device, G, to form connection with the registering mechanism, said pin being connected in any suitable manner with the actuating-lever of the register.

From the body A projects a slotted arm or support, H, to receive and fasten one end of the adjustable scale I for measuring the wires. The inner end of this scale is provided with a pin, *a*, which enters a hole in the body or frame A, while a rearwardly-projecting bolt, *b*, extends from the scale through the slot in the arm H, and a thumb-nut, *d*, screwed on the end thereof secures that end of the scale. The other end of the scale is supported by a standard, *f*, having a tenon with shoulder *e* to fit the hole or mortise in the bench. This standard may be made adjustable on the scale in any suitable manner, so as to make it coincide with the hole or mortise in the bench. This may be accomplished by having a series of holes or a slot in the scale, and fastening the standard by a bolt and nut at the required distance.

The curved measuring-scale I is formed with corrugated ways or parallel guides *i i* for a sliding gage, J, for securing one end of the wire until it is liberated by being cut off. The scale is self-adapting, according to the size and spring of the wire, which when strong curves more than weaker wire. The sliding gage J is adapted to both the plain and the grooved surface on the measuring-scale, and it has a socket sunk into its edge for the purpose of holding the foot of the wire.

At the upper part of the body A are two projections or arms, through the ends of which are passed set-screws K, for regulating or limiting the movement of the cam-lever D. This lever is pivoted between ears at the top of the body A, and operates against the plunger M for moving the cutter B, as well as communicating motion to the register.

In operation, the coil of wire is placed at the right hand of the operator, and one end of it raised to the machine by the left hand, with the outer curve of the wire from the operator. The end of the wire is then placed in the socket J, the wire resting in the groove formed by the ways or guides *i*. Curved projections *h h* on the body A, near the cutters, guide the wire against the spring C until it rests against a stop, *m*, when, by a slight motion of the cam-lever, the cutter B is moved, instantly cutting off the wire.

The measuring-scale I has the figures marked on the convex side, so that there will be no wear on the face while the wires are being cut.

Again, the commercial form of wire is in a coil, and placing the foot of the wire in the socket puts it at rest, while its true measurement can be obtained. The cutters are placed nearly at right angles with the curved measuring-scale, their cutting-faces being in line and the cutters beveled on one side, whereby the wire is at rest when the cutters strike it, and thus holding the wire precisely in position. Any variation reacts on the coil, and not on the pieces to be cut off. As soon as the wire is severed it is instantly thrown or dropped into the pile by its own weight and by the force of the spring C.

Having thus fully described my invention, what I claim as new, and desire to secure by Letters Patent, is—

1. The combination of the body A, provided with the slotted arm or support H, the adjustable scale I, provided with parallel ways or guides i i, pin a, and bolt b, the thumb-nut d, and standard f, with tenon or shoulder e, substantially as and for the purposes herein set forth.

2. The combination of the plunger M with pin G, registering device E, and cam-lever D, substantially as and for the purposes herein set forth.

3. The combination of the body A, plunger M, cam-lever D, and the adjustable set-screws K K, substantially as and for the purposes herein set forth.

In testimony that I claim the foregoing I have hereunto set my hand and seal this 25th day of October, 1878.

GUSTAVUS A. BARON. [L. S.]

Witnesses:
C. CONGER,
A. G. EATON.